United States Patent [19]

Schott et al.

[11] 3,879,311

[45] Apr. 22, 1975

[54] CATALYST REGENERATION

[75] Inventors: Stuart Schott, Cincinnati; David W. Lum, Reading; Irving L. Mador, Cincinnati, all of Ohio

[73] Assignee: National Distillers and Chemical Corporation, New York, N.Y.

[22] Filed: Apr. 26, 1973

[21] Appl. No.: 354,821

[52] U.S. Cl. ............ 252/415; 252/412; 260/497 A
[51] Int. Cl. ............................................. B01j 11/18
[58] Field of Search ................... 252/415, 413, 412; 260/497 A

[56] References Cited
UNITED STATES PATENTS

| | | | |
|---|---|---|---|
| 2,704,281 | 3/1955 | Appell | 252/413 |
| 3,016,354 | 6/1962 | Hindin | 252/415 |
| 3,134,732 | 5/1964 | Kearby et al. | 252/413 |
| 3,190,912 | 6/1965 | Robinson | 260/410.9 N |
| 3,201,355 | 8/1965 | Kimberlin Jr. et al. | 252/411 R |
| 3,480,558 | 11/1969 | Lum et al. | 252/416 |
| 3,488,295 | 1/1970 | Sennewald et al. | 252/415 |
| 3,660,306 | 5/1972 | Sennewald et al. | 252/415 |
| 3,743,607 | 7/1973 | Sennewald et al. | 260/497 A |

FOREIGN PATENTS OR APPLICATIONS

| | | | |
|---|---|---|---|
| 1,107,495 | 3/1968 | United Kingdom | 252/412 |

Primary Examiner—Winston A. Douglas
Assistant Examiner—P. E. Konopka
Attorney, Agent, or Firm—Allen A. Meyer, Jr.

[57] ABSTRACT

A process is described for the regeneration of palladium metal catalysts which are useful in the process for the synthesis of esters from olefins, carboxylic acids and molecular oxygen. The regeneration process comprises the following sequential steps: (a) washing the used catalyst with an aqueous hydrochloric acid solution containing hydrazine; (b) partially drying the catalyst to a moisture content of about 65 to 95% of saturation; (c) chlorinating the partially dried catalyst with chloride gas; (d) treating the chlorinated catalyst with moist air to remove excess chlorine and to insure even moisture distribution; (e) reducing the chlorinated catalyst by contact with an aqueous alkaline reducing solution; (f) washing the reduced catalyst to remove residual chlorides; and (g) drying the resulting regenerated catalyst. One particular application for the process is the regeneration of an alumina supported palladium metal-containing catalyst which has been employed in the vapor phase synthesis of unsaturated esters from olefins, organic acids and oxygen.

5 Claims, No Drawings

CATALYST REGENERATION

BACKGROUND OF THE INVENTION

The present invention relates to a catalyst regeneration process. More particularly, the invention pertains to a method for the regeneration of a support, palladium metalcontaining catalyst composition, which has been used in the synthesis of vinyl acetate from ethylene, acetic acid and oxygen.

U.S. Pat. No. 3,190,912 (1965) discloses the preparation of unsaturated esters from olefins, oxygen and organic acids in the vapor phase, utilizing, for example, a palladium metal catalyst supported on an alumina carrier. In recent years there have been numerous proposals to achieve improved catalyst activity and/or stability by the use of various activators for the catalytically active palladium metal. These activators include, for example, certain salts such as alkali metal and alkaline earth metal carboxylic acid salts, especially sodium and potassium acetates; as well as certain metals such as gold and platinum. The preferred carriers or supports for the palladium metal and its activators have been alumina and silicic acid (silica). Despite the improvements which have been achieved by the use of these activators, as well as others, in conjunction with the palladium metal catalysts, the catalyst compositions employed in this vapor phase process undergo a gradual loss in activity after prolonged use and consequently, require periodic regeneration in order to maintain the desired activity.

Although a variety of methods are known for the regeneration of Group VIII noble metal catalysts, e.g., palladium metal, it would be highly desirable to have available an effective method for such regeneration which did not involve the time-consuming and expensive procedures of stripping the palladium metal, generally in the form of soluble salts, from the inert support, purification of the thus recovered metal salts, deposition of the metal salt on new or used carrier, and then subsequent reduction of the metal salt. Obviously it would be very advantageous to devise a regeneration method which did not involve removal of the metallic palladium from the carrier. Owing to the high cost of the palladium metal and certain metal activators, if employed, any practical method of regeneration must avoid or minimize the loss of such metals as well as extensive migration of the metal or metals into the inert carrier where it would not be participating in the synthesis reaction, or avoid separation of the palladium metal from the metal activator whereupon the latter would no longer function in its activator capacity. It is also apparent that the regeneration method must be compatible with the particular carrier present in the catalyst composition as a support for the palladium metal and its activators. Finally, the regenerated catalyst must have substantially the same, if not improved, catalytic activity as a freshly prepared catalyst.

Recently issued U.S. Pat. No. 3,488,295 (1970) discloses a process for the regeneration of a catalyst containing metallic palladium deposited on a silicic acid carrier; the catalyst being used for the manufacture of vinyl acetate by the gas phase reaction of ethylene, acetic acid and oxygen or air. The presence in the catalyst composition of a variety of activators, some of which are enumerated above, for the active palladium metal constituent, is also disclosed. The patented process comprises washing the catalyst mass to be regenerated with water; treating the catalyst mass with moist chlorine gas or aqueous hydrochloric acid containing hydrogen peroxide; freeing the catalyst mass from excess chlorine (and especially evaporating the whole of the catalyst mass to dryness) by passing air over it; treating the dry chlorinated catalyst mass with aqueous hydrazine hydrate to obtain reduction; washing the catalyst mass with water; reactivating the resulting metallic palladium by treatment with an aqueous alkali metal acetate or formate solution; and then drying the catalyst mass.

Other U.S. patents relating to regenerating Group VIII noble metal catalysts or to catalysts employed in the synthesis of vinyl acetate include U.S. Pat. Nos. 3,201,355 (1965); 3,480,558 (1969); 3,497,460 (1970); and 3,660,306 (1972).

SUMMARY OF INVENTION

In accordance with the present invention it has not been found feasible to regenerate directly a supported palladium metal-containing catalyst. The process comprises a series of steps which are employed sequentially. Broadly defined, these steps are as follows:

a. washing a used supported palladium metalcontaining catalyst with a dilute aqueous hydrochloric acid solution containing a minor amount of an oxygen scavenger;

b. partially drying the washed catalyst to remove excess water in the catalyst;

c. chlorinating the partially dried catalyst;

d. passing moist air through the catalyst;

e. contacting the chlorinated catalyst with an aqueous alkaline reducing solution;

f. washing the resulting reduced catalyst with an aqueous solution; and g. drying the washed catalyst.

Each of the steps outlined above may be performed in a continuous, semicontinuous or batch manner of operation. Details of the individual steps will be set forth below. Moreover, the various treatments involved in the regeneration process will be described at times with respect to the preferred embodiments, i.e., the regeneration of a palladium metal-containing catalyst supported on an alumina carrier having reduced activity because of extended use as the catalyst composition in the vapor phase synthesis of vinyl acetate from ethylene, acetic acid and molecular oxygen.

a. Initial Washing Step

A dilute aqueous hydrochloric acid solution containing hydrazine is employed for washing the used catalyst in order to remove loose noble metal and carrier fines as well as the acid soluble salts of undesirable metal contaminants such as iron, nickel, copper, etc. If the catalyst has been used in the vinyl acetate vapor phase process, then the alkali metal or alkaline earth metal carboxylate activator will also be eliminated by this washing treatment.

The minimum concentration of the hydrochloric acid in the wash solution is about 1%, and preferably from about 2 to 4%, by weight. When the acidic wash solution had a concentration of less than about 1% hydrochloric acid, the subsequent chlorination was deleteriously affected. Apparently metallic palladium does not chlorinate effectively at moderate temperatures when the catalyst mass is basic or neutral. On the other hand, when the hydrochloric acid concentration was about 5% or greater, it interfered with the reduction step by neutralization of the alkali.

In order to minimize the loss of noble metals from the catalyst composition the acid wash should be under nonoxidizing conditions; it has been found desirable to incorporate a minor amount of an oxygen scavenger or reducing agent such as hydrazine, methylhydrazine, and the like in the wash solution. The amount of oxygen scavenger will generally range from about 0.05 to 0.5%, and preferably from about 0.1 to 0.2%, by weight in the wash solution. The oxygen scavenger helps to maintain the noble metals in a reduced state. Otherwise, a portion of the metals may be converted to the soluble chloride salts and lost during this initial washing step.

The washing step is normally carried out at atmospheric pressure and at temperatures ranging from ambient to 50°C. The equipment used in this step is not critical to the operation of the process and may be a conventional rotary or static washer.

b. Partial Drying Step

The saturated catalyst mass is next dried to lower the aqueous hydrochloric acid content (referred to herein as the "moisture content") of the saturated catalyst mass. Where alpha alumina is employed as the support the ideal moisture content is from about 18 to 27% based on the total weight of the catalyst plus water. If the amount of water exceeds about 28% the catalyst particles tend to agglomerate. If has also been found that with an excess of this amount of water present during the subsequent chlorination step there is a strong tendency for the noble metal salts to migrate from the support. With less than about 15% water present, the distribution of the metal or metals on the carrier is adversely affected upon reduction. The optimum amount of water will vary depending upon the absorbtivity of the particular carrier or support employed, and ideally the amount of water will represent approximately 65 to 95% of complete saturation of the catalyst mass. It has further been found that the presence of the specified amount of water (along with the residual hydrochloric acid) in the partially dried catalyst mass is advantageous for the chlorination step.

The partial drying step is preferably carried out under mild temperature and pressure conditions. One manner of carrying out this step would be to rotate or tumble the catalyst mass under a stream of warm air at an air temperature of from about 30° to 150°c. until the water content has been lowered to the desired amount. The catalyst mass is generally dried until it tumbles freely and no longer adheres to the walls of the equipment. Excessive heating should be avoided to prevent oxidation of the metals to the oxides. Also, tumbling should be kept to a minimum to avoid production of fines by attrition.

c. Chlorination Step

The partially dried catalyst mass containing residual hydrochloric acid, is then treated with gaseous chlorine to convert the metals to their chlorides. The chlorination treatment may be carried out under atmospheric pressure and at initial temperatures ranging from about ambient to about 65°C. It was further found advantageous to employ an excess of chlorine gas, at least 5% or more over the stoichiometric amount to insure complete chlorination. However, too large an excess of chlorine gas should be avoided since it interferes in the subsequent reduction step. Adequate contact time must be allowed to permit diffusion of the chlorine through the catalyst mass and thereby achieve substantially complete chlorination.

d. Moist Air Treatment Step

An important feature of the present invention resides in obtaining the chlorinated catalyst mass in the best form prior to reduction of the metal chlorides. If the chlorinated mass is reduced immediately following chlorination, in the presence of the excess chlorine the resulting catalyst has a poor activity. If a dry air sweep is employed to remove excess chlorine, the activity of the resulting catalyst is likewise less than optimum. The reason for the poor catalyst activities were not understood until it was recognized that water closest to the surface of the catalyst was apparently removed during chlorination and the subsequent air sweeping treatment.

One method of solving the problem of non-uniform moisture distribution is to hold the chlorinated catalyst mass for a sufficient period of time prior to reduction in order to obtain redistribution of residual water in the chlorinated catalyst from the internal portion thereof to the surface. In addition, this holding period permits excess chlorine to diffuse out of the catalyst mass, thus minimizing excess free chlorine present in the catalyst mass. This holding comprises storage of the chlorinated catalyst particles for periods of time ranging from about 1 to 24 hours, and preferably from about 1 to 10 hours. The time period may vary widely depending on such factors as the amount of residual water and chlorine in the chlorinated catalyst mass, the nature of the support, etc.

It has now been found that a better solution to overcoming the water depletion problem involves the use of moist air to sweep excess chlorine from the chlorinated mass. This can be carried out either during or subsequent to chlorination. Thus, for example, the chlorination can be carried out in a typical elongated reaction tube with concurrent, countercurrent, or mixed flow of chlorine gas and moist air. If the partially dried catalyst mass, containing residual hydrochloric acid, is fed to the top of the chlorinator, the chlorine gas can be fed into the chlorination zone through a plurality of feed lines. At the bottom of the chlorinator, and just prior to removal of the chlorinated catalyst mass, moist air is fed countercurrently or concurrently to the descending catalyst mass. The moist air should contain a sufficient amount of water to avoid water depletion from the chlorinated catalyst mass; and the flow of moist air is regulated to provide for removal of substantially all of the excess chlorine from the catalyst mass. Generally, the moist air will have a relative humidity of from about 60 to 100%.

e. Reduction Step

The chlorinated catalyst mass is subjected to a reduction treatment by contact with an aqueous reducing solution. This may be done either in a continuous or batch operation. Preferably the aqueous reducing solution is alkaline, and the reducing agent may be chosen from among such reagents as formaldehyde, hydrazine, sodium or potassium borohydride. The preferred system is aqueous alkaline formaldehyde solution. In accordance with one feature of the present invention it has been found essential to employ methanol in the alkaline formaldehyde solution, although the reasons for this are not presently understood. The reducing solution is generally freshly prepared because of its instability due to the reaction of the formaldehyde with the alkaline component, e.g., sodium hydroxide, to form sodium formate and methanol.

Typical alkaline formaldehyde compositions useful in the present process are as follows:

Parts By Weight

| | |
|---|---|
| Formaldehyde | 1 to 10 |
| Alkaline Material | 5 to 20 |
| Methanol | 5 to 20 |
| Water | Balance |

A particularly useful composition comprises a weight ratio of 15/5/10 parts by weight of alkaline material/formaldehyde/methanol. Due to the disproportionation reaction mentioned above, it will be understood that the ratio given above will be changing during the course of the reduction.

Alkaline material such as sodium hydroxide, potassium hydroxide, and the like as well as mixtures thereof can be utilized for this purpose. The presence of the alkaline material in the reducing solution is essential, since in its absence effective reduction is not obtained.

The reduction is carried out at atmospheric pressure and temperatures ranging from about 20° to 70°C. for time periods of at least about 1 hour. In general, the reduction temperature is maintained at less than about 60°C. to avoid problems resulting from the instability of the alkaline formaldehyde solution at higher temperatures. It is preferred to drop the chlorinated catalyst into an excess of the reducing solution over a relatively short period of time.

f. Final Washing Step

After reduction with the aqueous alkaline formaldehyde solution, the catalyst mass is washed with water to removed the residual reducing solution and soluble chloride components including by-product alkali metal chloride. Although pure water can be used in this treatment, a moderate stripping of noble metals was observed once most of the soluble salts had been removed. This loss of noble metals is minimized by incorporating an electrolyte in the wash water. Illustrative materials include alkali metal salts such as potassium acetate, sodium acetate, sodium phosphate, sodium carbonate, and the like as well as mixtures thereof. Salts which have a deleterious effect on catalyst activity, e.g., chlorides, iodides and bromides, should be avoided.

In general, the electrolyte will be employed in minor amounts ranging from about 0.05 to 0.5%, and preferably of from about 0.1 to 0.2%, by weight based on the total weight of the wash water.

This washing is also carried out under ambient temperature or elevated temperatures up to about 70°C. In general, washing is continued until a test of the effluent solution shows the substantial absence of chloride ions.

g. Final Drying Step

The regeneration process of this invention is completed by drying the catalyst mass. Conventional drying techniques can be employed such as drying under vacuum or by passing warm air over the catalyst mass. In the latter case, it is advantageous not to have the temperature of the catalyst mass exceed 150°C. Generally the catalyst is dried so as to contain less than about 5% moisture.

Additional Treatments

It will be understood that used catalyst compositions regenerated by the process of this invention may be subjected to a variety of preliminary treatments. Thus, for example, the used catalyst composition can be initially washed with water to remove most of the unreacted synthesis feed components, water soluble activators such as the alkali metal or alkaline earth metal carboxylic acid salts, and other water soluble contaminants. Screening of the catalyst mass to remove oversized and fine material is another optional pretreatment. In the event that the used catalyst mass contains a coating of carbon or polymeric materials, they may be burned off by treatment with an oxygen containing gas at elevated temperatures. Such a treatment may convert some of the palladium metal to the oxide, and this may require that the oxide be reduced by treatment with hydrogen or an aqueous alkaline formaldehyde solution prior to chlorination.

The palladium metal-containing catalyst composition that can be regenerated by the process of this invention includes supported palladium metal alone or palladium metal in admixture, alloyed or in solid solution with a minor amount of a Group 1 B or Group VIII metal such as gold, platinum, ruthenium, and the like as well as mixtures thereof. It will be understood that the exact makeup of the palladium catalyst composition is not a critical feature of this invention.

When the regenerated catalyst is intended for use in the vapor phase synthesis of vinyl acetate from ethylene, oxygen and acetic acid, the regenerated catalyst will ordinarily be treated with an additional aqueous solution of an alkali metal or alkaline earth metal carboxylate to act as an activator in the synthesis process. Preferred carboxylate activators are sodium acetate, potassium acetate and mixtures thereof.

The invention will be more fully understood by reference to the following illustrative embodiment.

EXAMPLE

A batch of catalyst containing palladium and gold metals on ⅛ inch alpha alumina tablets which had been employed for 10,000 hrs. in the vapor phase synthesis of vinyl acetate from ethylene, oxygen and acetic acid was screened, washed with deionized water and dried. Two hundred grams of the catalyst were covered with 400 g. of 2% aqueous hydrochloric acid solution containing 0.2% hydrazine. After 30 minutes of soaking at room temperature, the catalyst was drained free of excess acid solution. The acid washed catalyst was then dried under a stream of warm air until it tumbled freely and contained 25% by weight aqueous hydrochloric acid, based on the total weight of the catalyst plus aqueous acid (this corresponds to 90% of complete saturation). The catalyst was treated with gaseous chlorine for 10 minutes, and then blown with moist air for 45 minutes, both operations being performed at room temperature. The chlorinated catalyst was then poured into 400 g. of an aqueous solution containing by weight 15% sodium hydroxide, 5% formaldehyde and 10% methanol. The catalyst was reduced for 2 hours at a temperature of about 30° to 40°C., washed overnight in deionized water containing a 0.2% potassium acetate and dried in a vacuum oven at about 100°C.

The activity of the used catalyst before and after regeneration was tested as follows: 5 grams each of the used and the regenerated catalyst were activated with 0.1 g. of potassium acetate. The activator was dissolved in 3 ml. of deionized water, the excess water was removed on a rotary evaporator with water aspiration, and the catalyst dried in a vacuum oven at 100°C. The two catalysts were placed in small glass reactors and held at 140°C. while passing 0.2 liters per hour of a gas consisting of 15% oxygen in ethylene, saturated in acetic acid at 75°C., over the catalysts at atmospheric pressure. After 4 days continuous operation the reactor effluents were sampled by condensation in glass traps cooled in a dry-ice, isopropanol bath and analyzed by gas chromatography. The used and regenerated catalysts produced 5.7 and 10.0 millimoles of vinyl acetate per hour per 5 g. of catalyst, respectively. Fresh, unused catalyst equivalent to the used catalyst regenerated above typically produces about 9.5 to 10.3 millimoles per hour under the same test conditions.

Accordingly, the regeneration process of this invention comprises a series of sequential steps wherein the used, supported palladium metal catalyst is subjected to washing, partial drying, chlorination, moist aeration, reduction, washing, and drying. As described above, one of the essential features is the maintenance of an amount and distribution of water in the catalyst undergoing regeneration to ensure proper chlorination and reduction treatments. Another essential feature is the maintenance in the partially dried catalyst mass of residual hydrochloric acid, employed in the initial washing step, to ensure that there will be effective chlorination. Further, the reduction should be performed with an aqueous solution of alkaline formaldehyde containing methanol.

While particular embodiments of this invention are shown above, it will be understood that the invention is obviously subject to variations and modifications without departing from its broader aspects. Thus, for example, while the regeneration of a vinyl acetate catalyst has been illustrated, supported palladium metal containing catalyts used in other chemical reactions can be effectively regenerated by the practice of this invention.

What is claimed is:

1. A process for the regeneration of a metal catalyst used in a vapor phase process for the production of vinyl acetate from ethylene, oxygen and acetic acid, said catalyst comprising a combination of a palladium, gold and an alumina support, which comprises the following sequential steps:
   a. washing and saturating the metal catalyst to be regenerated with an aqueous hydrochloric acid solution containing about 1 to 4% by weight of hydrochloric acid and from about 0.05 to 0.5% by weight of an oxygen scavenger selected from the group consisting of hydrazine and methylhydrazine to remove loose metal, support fines, and soluble salts of undesirable metal contaminants from the metal catalyst;
   b. partially drying the washed metal catalyst to lower the amount of water in the catalyst to a range of from about 65 to 95% of saturation;
   c. contacting the partially dried metal catalyst with gaseous chlorine to obtain a chlorinated metal catalyst;
   d. passing moist air over the chlorinated metal catalyst to remove substantially all excess chlorine from the chlorinated metal catalyst;
   e. contacting the chlorinated metal catalyst with an aqueous alkaline reducing solution comprising about 1 to 10 parts by weight formaldehyde, about 5 to 20 parts by weight of methanol and about 5 to 20 parts by weight of an alkali metal hydroxide selected from the group consisting of sodium hydroxide, potassium hydroxide and mixtures thereof to reduce the chlorinated metal catalyst to a metal catalyst;
   f. washing the resulting reduced metal catalyst with an aqueous solution containing from about 0.05 to 0.5% by weight of an alkali metal compound selected from the group consisting of potassium acetate, sodium acetate, sodium phosphate, sodium carbonate and mixtures thereof to remove residual reducing solution and soluble chloride components; and
   g. drying the washed, reduced metal catalyst.

2. The process of claim 1 wherein said aqueous alkaline reducing solution contains sodium hydroxide, formaldehyde and methanol.

3. The process of claim 1 wherein the alkali metal compound is potassium acetate.

4. The process of claim 1 wherein the alkali metal compound is sodium acetate.

5. The process of claim 1 wherein the oxygen scavenger is hydrazine.

* * * * *